Jan. 15, 1957 V. EY 2,777,456
GAS PRESSURE REGULATORS
Filed May 14, 1952

INVENTOR.
Victor Ey
BY
Clark & Ott
ATTORNEYS:

United States Patent Office 2,777,456
Patented Jan. 15, 1957

2,777,456

GAS PRESSURE REGULATORS

Victor Ey, Woodside, N. Y.

Application May 14, 1952, Serial No. 287,741

4 Claims. (Cl. 137—73)

This invention relates to gas pressure regulators.

The invention comprehends a gas pressure regulator adapted for use in homes, factories and the like for regulating the pressure and flow of gas to service gas lines. The invention has for an object to provide an improved gas regulator which shuts off the flow of gas in the event of fire and during replacement of broken parts.

Another object of the invention is to provide a gas pressure regulator of the spring pressed diaphragm type having a spring pressed ball valve freely engaging against the end of a fusible stem carried by the diaphragm whereby the ball valve is free to close off the flow of gas through the regulator in the event of fire of sufficient intensity to melt the plug and which will shut off the flow of gas through the regulator in the event of breakage of the spring and whenever it is necessary to open the regulator to replace the spring or diaphragm.

Still another object of the invention is to provide a gas pressure regulator of said character in which the fusible plug is composed of metal which will melt at a temperature below the charring temperature of the diaphragm whereby the ball valve will be moved to closed relation in the event of a fire of sufficient intensity to char the diaphragm.

Still another object of the invention is to provide a gas pressure regulator in which the ball valve is so located that it is inaccessible and cannot be tampered with from the outside of the regulator after installation thereof.

With the foregoing and other objects in view, reference is now made to the following specification and accompanying drawings in which the preferred embodiment of the invention is illustrated.

Figure 1:
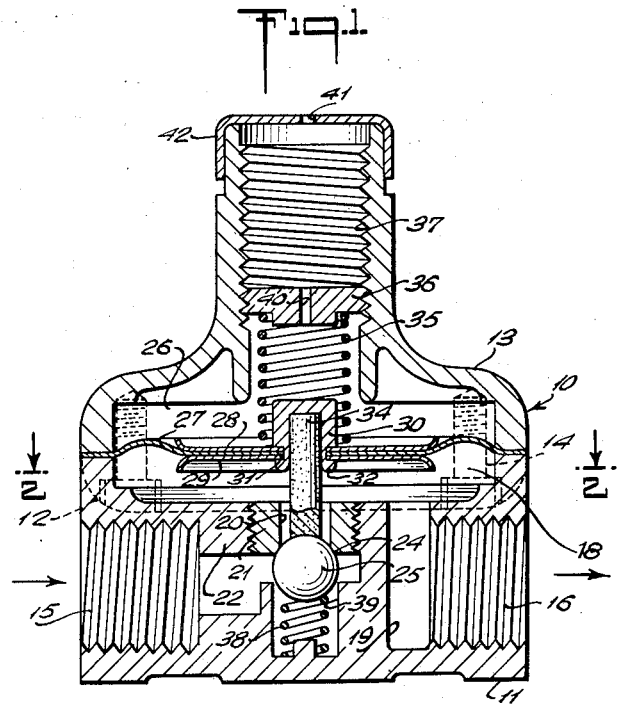
Fig. 1 is a vertical sectional view through a gas pressure regulator constructed in accordance with the invention.
Figure 2:
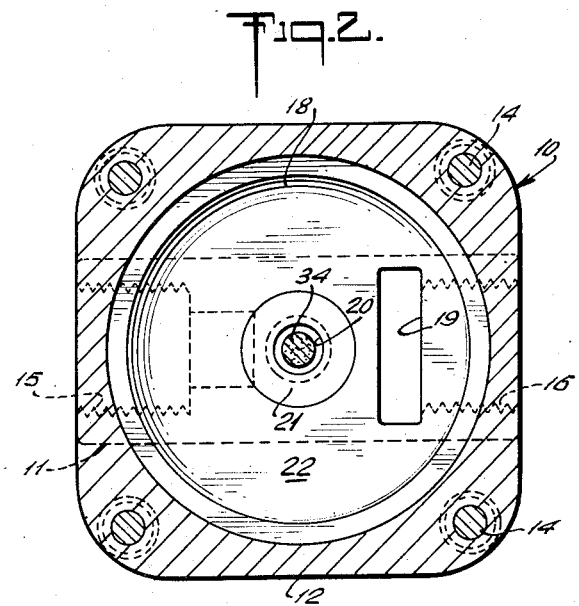
Fig. 2 is a horizontal sectional view taken approximately on line 2—2 of Fig. 1.

Referring to the drawings by characters of reference, the gas pressure regulator includes a body 10 consisting of a bottom portion 11 of general rectangular formation having a rectangular shaped flange 12 to which an upper portion or cap 13 is affixed by bolts 14. The bottom portion 11 is provided with a threaded inlet 15 and a threaded outlet 16 adapted to be connected respectively with a gas main and a gas service line for regulating the pressure and flow of gas to burners connected with the service line. The bottom portion 11 is also formed with an annular recess 18 opening through the upper face of the flange 12 and which communicates through a downwardly directed rectangular opening 19 with the threaded outlet 16 and communicates with the threaded inlet 15 through a circular passageway 20 formed in a bushing 21 threadedly secured in a partition wall 22. The passageway 20 is located centrally of the lower body portion 11 and the lower end thereof is flared as at 24 to provide a valve seat for a ball valve 25 which is adapted to move toward and away from said seat for regulating the pressure and flow of the gas through the regulator.

The upper portion or cap 13 is provided with an annular recess 26 which opens through the bottom thereof and is adapted to mate with the annular recess 18 in the bottom portion 11. A flexible diaphragm 27 of leather or equivalent pliable material is secured between the lower body portion 11 and the cap 13 to separate the recesses 18 and 26. The central portion of the diaphragm 27 is stiffened by means of upper and lower metallic members 28 and 29 having rolled peripheral edges and which are secured to the diaphragm by a head 30 having a reduced lower end 31 protruding through apertures in the diaphragm and in the members 28 and 29 with the lower end 32 thereof peened over into securing relation against the under side of the member 29.

A fusible stem 34 is frictionally fitted at its upper end in the recess in the head 30 and extends axially downward into engagement with the ball valve 25. The diaphragm 27 is tensioned by means of a coiled expansion spring 35 to normally maintain the ball valve 25 in open relation with reference to the seat 24. The spring 35 is interposed between the diaphragm 27 and a threaded plug 36 which is adjustable in the threaded opening 37 in the upper end of the cap 13 to vary the tension on the spring 35 so as to provide the desired pressure and flow of the gas through the passageway 20 about the stem 34. The tension of the spring 35 against the ball valve 25 is opposed by a coiled expansion spring 38 which is located in an annular recess 39 in the bottom portion 11 and interposed between the ball valve 25 and the bottom of said recess, the recess 39 being of a size in cross-sectional area to receive the ball valve 25 therein to permit wide opening of the passageway 20. The recess 26 in the cap 13 forms a chamber above the diaphragm 27 which is open to the atmosphere through a small opening 40 in the screw plug 36 and through an opening 41 in a cover 42 frictionally fitted on the top of the cap 13.

Constructed in this manner, the ball valve 25 is normally disposed in open relation so as to permit of the flow of gas through the gas pressure regulator in accordance with the requirements by the burners connected with the gas service line (not shown). When the pressure decreases in the outlet 16 due to the turning on of the burners, the diaphragm 27 will be depressed by the spring 35 to lower the ball valve 25 so as to increase the flow of gas.

The fusible stem 34 is composed of a suitable metal which will melt or fuse at a temperature below the charring temperature of the diaphragm 27 so that in the event of a fire which would heat the body 10 of the regulator sufficiently to char the diaphragm 27, the fusible stem 34 will melt and the spring 38 would then function to move the ball valve 25 to closed relation with the seat 24 to thereby close off the flow of gas through the regulator. The arrangement of the fusible stem 34 between the diaphragm and the ball valve 25 also functions to effect the shutting off of the flow of gas through the regulator in the event that the spring 35 would become broken. This is a distinct advantage in that it prevents the flow of gas when the cap 13 is removed for replacing the diaphragm 27 in the event that the same becomes worn, and for replacement of the spring 35.

What is claimed is:

1. In fluid pressure regulator, a valve body having a fluid chamber, an inlet and an outlet port, a flexible diaphragm subdividing said chamber into opposite compartments, a partition wall separating said inlet and outlet ports, said partition having a flow passageway establishing communication between said inlet port and one of said compartments and providing a valve seat, the outlet port having communication with said last mentioned compartment, a valve adapted to seat on said valve seat for regulating the flow of fluid through said passageway, a head carried by said diaphragm, a fusible stem operatively connected with said head and engaging said valve for movement of the valve in opening direction with the movement of said diaphragm upon decrease in pressure in said last mentioned compartment, said stem being exposed to the side walls of said last mentioned compartment between said partition wall and said diaphragm, means biasing said valve toward said valve seat, means biasing said diaphragm for normally maintaining the valve in open relation, and means for adjusting the bias of said last mentioned means for varying the pressure in said last mentioned compartment.

2. In a fluid pressure regulator, a valve body having a fluid chamber, an inlet and an outlet port, a flexible diaphragm subdividing said chamber into opposite compartments, a partition wall separating said inlet and outlet ports, said partition having a flow passageway establishing communication between said inlet port and one of said compartments and providing a valve seat, the outlet port having communication with said last mentioned compartment, a valve adapted to seat on said valve seat for regulating the flow of fluid through said passageway, a head carried by said diaphragm, a fusible stem operatively connected with said head and engaging said valve for movement of the valve in opening direction with the movement of said diaphragm upon decrease in pressure in said last mentioned compartment, said stem being exposed to the side walls of said last mentioned compartment between said partition wall and said diaphragm, means biasing said valve toward said valve seat, spring means biasing said diaphragm for normally maintaining the valve in open relation, and means for adjusting the bias of said spring means for varying the pressure in said last mentioned compartment.

3. In a fluid pressure regulator, a valve body having a fluid chamber, an inlet and an outlet port, a flexible diaphragm subdividing said chamber into opposite compartments, a partition wall separating said inlet and outlet ports, said partition having a flow passageway establishing communication between said inlet port and one of said compartments and providing a valve seat, the outlet port having communication with said last mentioned compartment, a valve adapted to seat on said valve seat for regulating the flow of fluid through said passageway, a head carried by said diaphragm, a fusible stem operatively connected with said head and engaging said valve for movement of the valve in opening direction with the movement of said diaphragm upon decrease in pressure in said last mentioned compartment, said stem being exposed to the side walls of said last mentioned compartment between said partition wall and said diaphragm, spring means biasing said valve toward said valve seat, means biasing said diaphragm for normally maintaining the valve in open relation, and means for adjusting the bias of said last mentioned means for varying the pressure in said last mentioned compartment.

4. In a fluid pressure regulator, a valve body having a fluid chamber, an inlet and an outlet port, a flexible diaphragm subdividing said chamber into opposite compartments, a partition wall separating said inlet and outlet ports, said partition having a flow passageway establishing communication between said inlet port and one of said compartments and providing a valve seat, the outlet port having communication with said last mentioned compartment, a valve adapted to seat on said valve seat for regulating the flow of fluid through said passageway, a head carried by said diaphragm, a fusible stem operatively connected with said head and engaging said valve for movement of the valve in opening direction with the movement of said diaphragm upon decrease in pressure in said last mentioned compartment, said stem being exposed to the side walls of said last mentioned compartment between said partition wall and said diaphragm, spring means biasing said valve toward said valve seat, spring means biasing said diaphragm for normally maintaining said valve in open relation, and means for adjusting the bias of said last mentioned spring means for varying the pressure in said last mentioned compartment.

References Cited in the file of this patent

UNITED STATES PATENTS

| | | |
|---|---|---|
| 532,655 | Foster | Jan. 15, 1895 |
| 792,757 | Cloos | June 20, 1905 |
| 885,812 | Ward | Apr. 28, 1908 |
| 894,018 | Kirchbaum | July 21, 1908 |
| 1,507,073 | Lewis | Sept. 2, 1924 |
| 1,512,243 | Shrode | Oct. 21, 1924 |
| 1,532,615 | Wills | Apr. 7, 1925 |
| 1,782,760 | Lovekin | Nov. 25, 1930 |
| 1,783,395 | Taylor | Dec. 2, 1930 |
| 2,080,373 | Marvin | May 11, 1937 |
| 2,156,823 | Stettner | May 2, 1939 |
| 2,362,352 | Buttner | Nov. 7, 1944 |
| 2,647,720 | Volpin | Aug. 4, 1953 |

FOREIGN PATENTS

| | | |
|---|---|---|
| 12,999 | Great Britain | of 1886 |